UNITED STATES PATENT OFFICE.

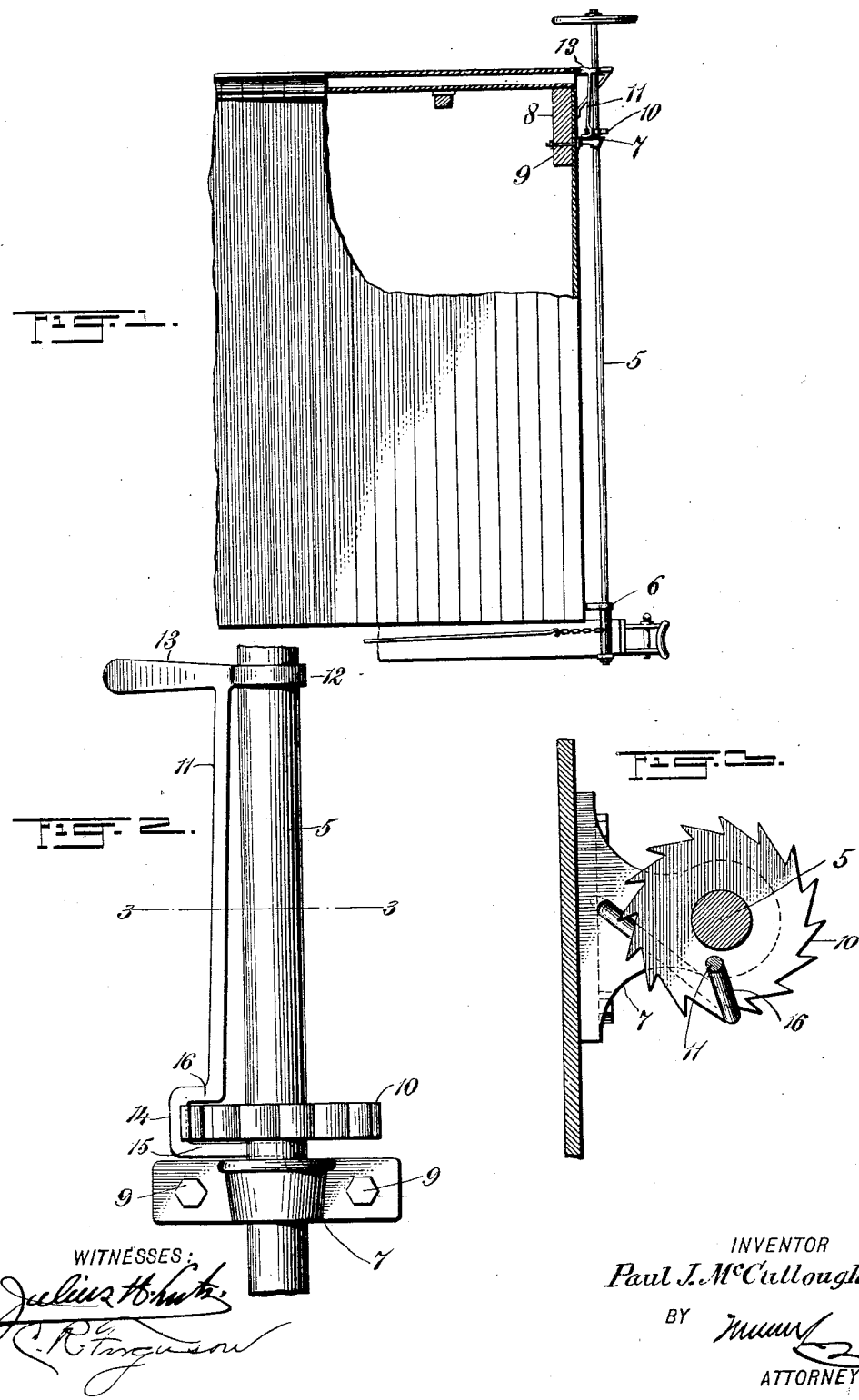

PAUL J. McCULLOUGH, OF ST. LOUIS, MISSOURI.

BRAKE MECHANISM.

SPECIFICATION forming part of Letters Patent No. 702,812, dated June 17, 1902.

Application filed November 15, 1901. Serial No. 82,396. (No model.)

*To all whom it may concern:*

Be it known that I, PAUL J. MCCULLOUGH, a citizen of the United States, and a resident of St. Louis, in the State of Missouri, have invented a new and Improved Brake Mechanism, of which the following is a full, clear, and exact description.

This invention relates to improvements in car-brake mechanism. In the usual arrangement of freight-car brakes the brake-staff or rod-guides are fastened to the top of the car by means of lag-screws placed in the decking, and said screws are liable to work loose. In some instances the guide projects down over the edge of the car and is bolted in place, in which case there is a prying or bending strain on the bolts when the brake is set.

The object of my invention is to overcome the above objections by providing a simple means whereby tensile strain only is brought to bear upon the fastening-bolts.

I will describe a brake mechanism embodying my invention and then point out the novel features in the appended claims.

Reference is to be had to the accompanying drawings, forming a part of this specification, in which similar characters of reference indicate corresponding parts in all the figures.

Figure 1 is a side elevation of a portion of a car, partly broken away and in section, showing a brake mechanism embodying my invention as applied thereto. Fig. 2 is a detail view showing the locking means for the brake-staff, and Fig. 3 is a section on the line 3 3 of Fig. 2.

Referring to the drawings, 5 designates the brake staff or rod of the usual construction, having a bearing at its lower end in a plate 6, attached to the car, and at its upper end it has a bearing in a guide 7, consisting of a plate substantially in the form of a bracket and secured to the end plate 8 at the end of the car by means of bolts 9. These bolts of course extend in a horizontal direction.

Attached to the staff 5 above the guide 7 is a ratchet-wheel 10, designed to be engaged by a dog for holding the brake-staff when the brake is set. This dog consists of a rod 11, having extended laterally from its upper end a collar 12, which surrounds the staff 5, so that said dog may swing on the staff. Extended in the opposite direction from the collar 12 is a lever 13, against which a brakeman may place his foot to move the lower portion of the dog out of engagement with the ratchet-wheel. At its lower end the dog has a crank portion 14 for engaging with a tooth of the ratchet-wheel, and from this crank portion an arm 15 extends rearward, and at its end this arm is provided with a downwardly-extended lug, which has a bearing in an opening in the top plate of the guide 7, as shown in dotted lines in Fig. 2. Above the crank 14 the dog is bent to form a shoulder 16, which will pass over the top of the ratchet-wheel 10 and prevent any possible upward movement of the staff. It will be seen that the lower end bearing is at one side or out of line with the upper end bearing, and therefore when the dog is moved in one direction the crank portion will be released from the wheel.

The disengaging movement is so slight that the collar need have but little play on the staff or be but slightly larger than the staff to prevent binding.

Having thus described my invention, I claim as new and desire to secure by Letters Patent—

1. A brake-staff, a guide therefor, a ratchet-wheel on the staff, and a holding-dog for engaging with the ratchet-wheel, the said dog having swinging connection at its upper end with the staff and a lower end bearing at one side of the staff, substantially as specified.

2. A brake-staff, a guide therefor arranged on the end of a car, bolts passing horizontally through said guide and through the end of the car, a ratchet-wheel on the staff, and a holding-dog consisting of a rod mounted to swing at its upper end on the staff and having a bearing at its lower end in a guide at one side of the staff, the said dog having a crank portion for engaging with the ratchet-wheel, substantially as specified.

3. A brake-staff, a guide in which said brake-staff is mounted to turn, a ratchet-wheel on the staff, and a holding-dog for engaging with the ratchet-wheel, the said holding-dog having a laterally-extended collar at its upper end through which the staff passes and the said dog having a bearing at its lower end at one side of the staff, said dog having a crank portion for engaging with the ratchet-wheel and a return portion or shoulder for engaging upon the upper side of the wheel, substantially as specified.

In testimony whereof I have signed my name to this specification in the presence of two subscribing witnesses.

PAUL J. McCULLOUGH.

Witnesses:
 WM. J. MURRAY,
 JOHN RUECKERT.